United States Patent [19]

Muszynski

[11] 4,449,852
[45] May 22, 1984

[54] BUCKLE ARRESTOR
[75] Inventor: Larry C. Muszynski, Houston, Tex.
[73] Assignee: Shell Oil Company, Houston, Tex.
[21] Appl. No.: 403,377
[22] Filed: Jul. 30, 1982
[51] Int. Cl.³ .............................. F16L 1/00; F16L 9/22
[52] U.S. Cl. .................................... 405/168; 138/172; 405/158; 405/166
[58] Field of Search ................ 405/154, 155, 156, 158, 405/168-171; 29/237; 138/109, 103, 155, 172, 177, 141-149, 153; 156/78, 94; 264/31-36

[56] References Cited
U.S. PATENT DOCUMENTS 2,305,017 12/1942 Lewis .................................. 138/141
3,080,253 3/1963 Dietz et al. ......................... 138/146
3,289,704 12/1966 Nicosia ............................ 138/141 X
3,447,572 6/1969 Vanderbilt et al. ............ 138/153 X
3,491,171 1/1970 French ............................. 138/141 X
3,718,161 2/1973 Woodson ............................. 138/153
3,768,269 10/1973 Broussard et al. .................. 405/168
3,860,039 1/1975 Ells ................................... 138/177 X
4,148,127 4/1979 Somerville ..................... 405/168 X
4,364,692 12/1982 Kyriakides et al. ............ 138/172 X Primary Examiner—Dennis L. Taylor

[57] ABSTRACT

A pipeline buckle arrestor or preventor is provided which is composed of a fiber-reinforced resin cover secured to at least a portion of the outside of the pipeline and a polymer-concrete formulation encapsulating the resin cover.

10 Claims, 1 Drawing Figure

BUCKLE ARRESTOR

BACKGROUND OF THE INVENTION

The present invention relates to a method and apparatus for reducing or eliminating propagating buckle failures in underwater pipelines. Deep water offshore pipelines having high diameter to wall thickness ratios can buckle in one section and the buckle can propagate along the pipeline until it either encounters an obstacle such as a valve body or until the water depth is substantially decreased.

Buckle failures in underwater pipelines are also induced by pipelaying operations during construction. Pipelaying apparatus maintains the pipe in tension by gripping means engaging the outside diameter of the pipe and as a result tends to oval pipe having thin walls. By ovaling the pipe, the buckle resistance can be reduced by as much as 40 percent if the pipe is deformed one wall thickness. Such a reduction of the buckle resistance is substantial. A result of this is that heavier walled pipe is used, greatly increasing the cost of the underwater pipeline. Buckling may also be induced after construction and during operation of the pipeline by damage caused by external forces such as dragging ship anchors, mud slides, water-induced movement or other disturbances. Reference may be had to U.S. Pat. Nos. 3,768,269 and 3,747,356.

SUMMARY OF THE INVENTION

The present invention advantageously solves the problem of prograting buckles in underwater pipelines and also the problem of pipelines bursting in the area of welds or other joints, by providing a pipeline buckle arrestor or preventor which is composed of a two-component cover secured about the pipeline, such as in the location of pipe joints, one component of the cover having high tensile strength and the other component of the cover having high compressive strength. While a single component cover may be employed with good results, for example, a fiber-reinforced resin cover having high tensile strength, it is found that using the two-component cover which includes, for example, a polymer-concrete formulation overlaying the first cover, achieves synergistic results. Even more preferably, the resin of the underlaying cover is a B-staged epoxy and the concrete formulation includes aggregate.

DESCRIPTION OF PREFERRED EMBODIMENTS

Figure 1:
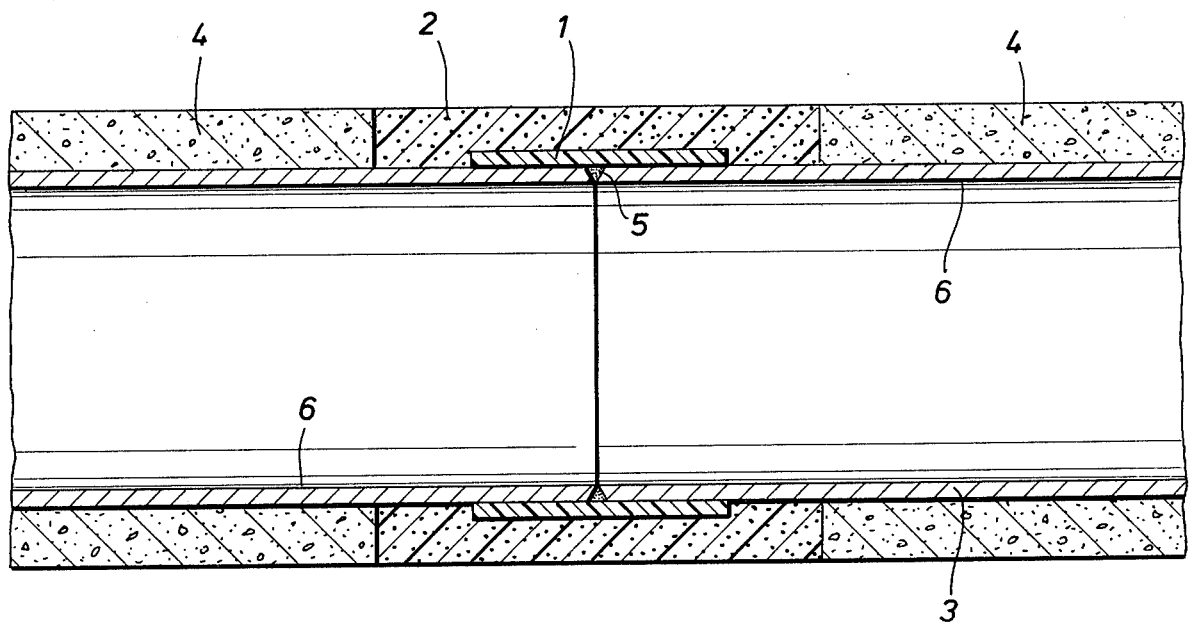
FIG. 1 provides a cross sectional view showing the buckle arrestor or preventor of the present invention.

The buckle arrestors previously utilized for offshore pipelines have been heavy walled lengths of pipe whose inside diameter is slightly larger than the outside diameter of the pipeline, but whose wall thickness is greater than the pipeline. These arrestors may be friction-fitted over the pipeline, welded to the pipeline, grouted to the pipeline, etc.

Referring now to FIG. 1, it will be seen that the present invention provides a new type of improved buckle arrestor which also is useful for preventing pipeline bursts, particular in the area of welds or other joints. The composite buckle arrestor shown in FIG. 1 is a combination of two composite materials which exhibit synergism and cooperate in a manner not obtained by the prior art. Wrapping 1 is a preimpregnated laminate material of a phenolic, melamine-formaldehyde, epoxy, silicone, polyester, polyamide, triazine or polytetrafluororthylene resin, which is combined with either organic, inorganic or metallic fiber reinforcement. Preferably, the resin is a B-staged epoxy, and the fiber is glass when the resin is epoxy or polyester and paper, cotton or cellulose when the resin is phenolic. Joint fill 2 preferably is a polymer-concrete formulation, for example about 3–15% by weight acrylic, polyester, vinylester, epoxy or furan resins and about 81–97% by weight aggregate such as sand, gravel, fly ash and/or organic, inorganic or metallic fibers, rubber, expanded mica, vermiculite or perlite. The two covers 1 and 2 may be electrically conductive for cathodic protection purposes. Pipeline 3 may have a standard concrete weight coating 4 which is normally about 2 to 9 inches thick. A weld 5 joins the two pipe ends together (or the pipe ends can be joined by other means), and the covers 1 and 2 normally overlay this joining area and also serve to prevent the pipe from bursting at such joints. Normally, the pipe will have coating 6 such as epoxy of about 12 mils. thickness to prevent corrosion or coal tar enamel of about 5/16-inch thickness.

To prepare the first coating 1, the base steel pipe joint is heated to about 350° to 500° F. with an induction heater, the preimpregnated laminate material is then wrapped around the joint, and the polymer-concrete fill material 2 is added between the concrete weight coatings 4.

It will be apparent that the buckling of a pipe results in both tensile and compressive stresses being induced in the pipe wall and the exterior pipe coating. The fiber reinforced layer 1 acts as the corrosion coating and provides additional hoop strength and bonds well to the steel pipe 3. The polymer concrete cover 2 acts as a joint fill material and provides the compressive strength and acts to increase the moment of inertia, thus providing more ring stiffness. This effectively reduces the D/T (diameter to wall thickness ratio) of the pipe at the joint and increases the buckle propagation pressure. The bond strength of the pipeline corrosion coating to the preimpregnated laminate material 1 is also excellent.

What is claimed is:

1. A pipeline buckle arrestor or preventor secured to the outside circumference of a minor portion of a steel pipeline comprising a fiber-reinforced resin cover immediately adjacent to the pipeline and a polymer-concrete formulation encapsulating the resin cover.

2. The arrestor of claim 1 wherein the resin is a B-staged epoxy and the polymer-concrete formulation includes aggregate.

3. The method of claim 1 wherein the buckle arrestor is electrically conductive for cathodic protection purposes.

4. A method for preventing a collapse from propagating along an underwater pipeline, comprising increasing the hoop strength of a minor portion of the pipeline in at least one location by bonding a high tensile strength cover of fiber-reinforced resin thereto and increasing the moment of inertia of the pipeline in the same location by encapsulating the high tensile strength cover with a high compressive strength cover of polymer-concrete formulation.

5. The method of claim 4 wherein the fiber-reinforced resin is B-staged epoxy.

6. The method of claim 4 wherein said at least one location is where two pipes are joined together and the covers reduce the likelihood of the pipeline bursting at said location.

7. The method of claim 4 wherein said bonding is effected by heating the pipeline to about 350° to 500° F.

8. The method of claim 7 wherein the fiber-reinforced resin is a preimpregnated laminate which is wrapped around the heated pipeline.

9. The method of claim 8 wherein the pipeline is heated with an induction heater.

10. The method of claim 8 wherein the polymer-concrete formulation is added between concrete weight coatings around the pipeline.

* * * * *